United States Patent
Döring

(10) Patent No.: US 9,574,482 B2
(45) Date of Patent: Feb. 21, 2017

(54) METHOD FOR OPERATING COMPONENTS FOR EXHAUST GAS AFTER-TREATMENT AND EXHAUST GAS AFTER-TREATMENT APPARATUS

(75) Inventor: Andreas Döring, München (DE)

(73) Assignee: MAN Truck & Bus AG, Munich (DE)

( * ) Notice: Subject to any disclaimer, the term of this patent is extended or adjusted under 35 U.S.C. 154(b) by 421 days.

(21) Appl. No.: 13/181,823

(22) Filed: Jul. 13, 2011

(65) Prior Publication Data

US 2011/0283681 A1 Nov. 24, 2011

Related U.S. Application Data

(63) Continuation of application No. PCT/EP2010/000083, filed on Jan. 11, 2010.

(30) Foreign Application Priority Data

Jan. 13, 2009 (DE) .................. 10 2009 004 416
Dec. 14, 2009 (EP) ...................... 09015451

(51) Int. Cl.
*F01N 3/00* (2006.01)
*F01N 9/00* (2006.01)
(Continued)

(52) U.S. Cl.
CPC ............... *F01N 9/00* (2013.01); *F01N 3/023* (2013.01); *F01N 3/2006* (2013.01); *F02B 37/00* (2013.01);
(Continued)

(58) Field of Classification Search
USPC .......................... 60/274, 280, 289, 300, 303
See application file for complete search history.

(56) References Cited

U.S. PATENT DOCUMENTS 4,902,487 A 2/1990 Cooper et al.
6,370,916 B1 4/2002 Yabuki
(Continued)

FOREIGN PATENT DOCUMENTS

DE 199 13 462 A1 9/2000
DE 102334495 A1 1/2004
(Continued)

*Primary Examiner* — Thomas Denion
*Assistant Examiner* — Matthew T Largi
(74) *Attorney, Agent, or Firm* — Laurence A. Greenberg; Werner H. Stemer; Ralph E. Locher

(57) ABSTRACT

A method of operating components for exhaust gas after-treatment disposed in the exhaust gas tract of a turbocharged internal combustion engine. A partial exhaust gas stream is removed from the main exhaust gas stream upstream of at least one exhaust gas turbine. The partial exhaust gas stream is fed back into the main exhaust gas stream downstream of the at least one exhaust gas turbine. The feed is located, in terms of exhaust flow, between an NO oxidation catalytic converter and a particle filter (i.e., the exhaust gas after-treatment component). That is, the at least one exhaust gas after-treatment component is arranged downstream of the feed. The quantity of exhaust gas branched off as a partial exhaust gas stream is controlled or closed-loop controlled as a function of at least one target temperature in at least one defined point in the exhaust gas tract, in particular in the partial exhaust gas stream and/or of the at least one exhaust gas after-treatment component.

5 Claims, 1 Drawing Sheet

(51) Int. Cl.
*F01N 3/023* (2006.01)
*F01N 3/20* (2006.01)
*F02B 37/00* (2006.01)

(52) U.S. Cl.
CPC ........ *F01N 2410/03* (2013.01); *F01N 2560/06* (2013.01); *Y02T 10/144* (2013.01); *Y02T 10/22* (2013.01); *Y02T 10/26* (2013.01); *Y02T 10/47* (2013.01)

(56) References Cited

U.S. PATENT DOCUMENTS

| | | | |
|---|---|---|---|
| 6,393,850 B1 * | 5/2002 | Vanderstraeten | 62/196.3 |
| 6,637,204 B2 * | 10/2003 | Ellmer et al. | 60/606 |
| 6,851,256 B2 * | 2/2005 | Chamoto et al. | 60/280 |
| 6,862,878 B2 * | 3/2005 | Ries-Mueller | 60/277 |
| 7,000,384 B2 * | 2/2006 | Kagenishi | 60/295 |
| 7,802,419 B2 | 9/2010 | Döring | |
| 7,937,933 B2 | 5/2011 | Döring et al. | |
| 2005/0188682 A1 * | 9/2005 | Fledersbacher et al. | 60/284 |
| 2006/0130469 A1 * | 6/2006 | Baeuerle et al. | 60/300 |
| 2008/0041052 A1 | 2/2008 | Döring et al. | |
| 2009/0077965 A1 * | 3/2009 | Pursifull | 60/602 |
| 2012/0279216 A1 * | 11/2012 | Otsuka | 60/602 |
| 2013/0211693 A1 * | 8/2013 | Petrovic et al. | 701/104 |

FOREIGN PATENT DOCUMENTS

| | | | | |
|---|---|---|---|---|
| DE | 102004009791 A1 | | 9/2005 | |
| DE | 10 2006 038 289 A1 | | 2/2008 | |
| DE | 10 2006 038 290 A1 | | 2/2008 | |
| DE | 10 2006 038 291 A1 | | 2/2008 | |
| EP | 0 341 832 A2 | | 11/1989 | |
| EP | 1 022 765 A1 | | 7/2000 | |
| FR | 2906310 A1 | | 3/2008 | |
| GB | 2229937 A | * | 10/1990 | ............ F01N 3/02 |
| JP | 63134810 A | | 6/1988 | |
| JP | 07269393 A | * | 10/1995 | ............ F02D 35/00 |
| JP | 10121939 A | | 5/1998 | |
| JP | 2009287409 A | * | 12/2009 | |
| WO | 2008037902 A1 | | 4/2008 | |
| WO | WO 2008/037902 | * | 4/2008 | |

\* cited by examiner

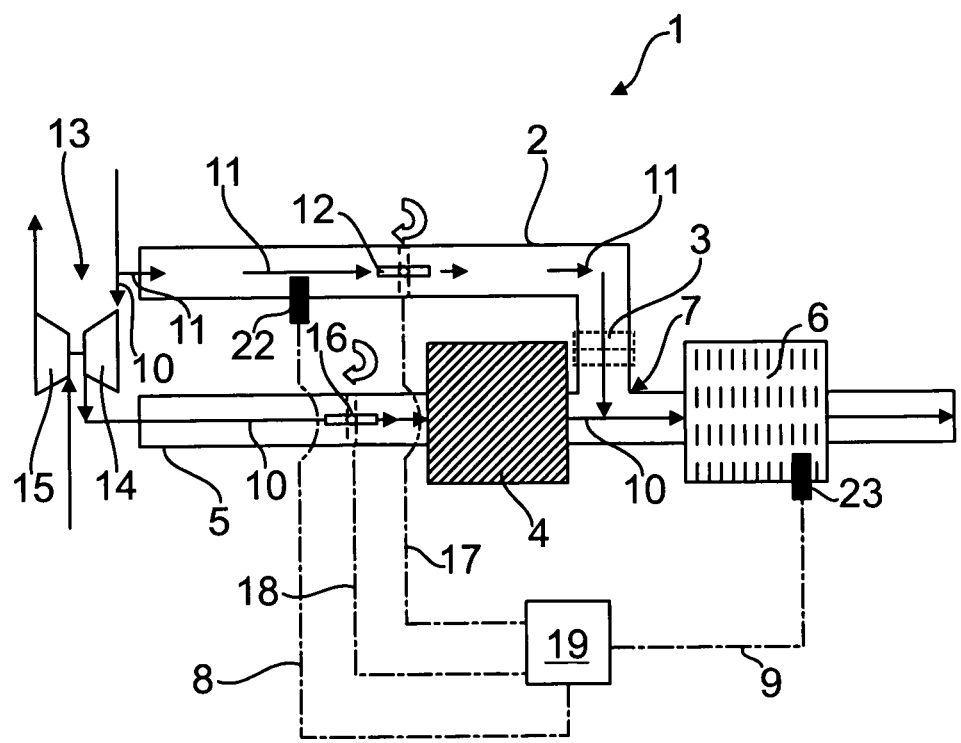

METHOD FOR OPERATING COMPONENTS FOR EXHAUST GAS AFTER-TREATMENT AND EXHAUST GAS AFTER-TREATMENT APPARATUS

CROSS-REFERENCE TO RELATED APPLICATION

This is a continuation application, under 35 U.S.C. §120, of copending international application No. PCT/EP2010/000083, filed Jan. 11, 2010, which designated the United States; this application also claims the priority, under 35 U.S.C. §119, of German patent application No. DE 10 2009 004 416.7, filed Jan. 13, 2009, and European patent application No. EP 09015451, filed Dec. 14, 2009; the prior applications are herewith incorporation by reference in their entirety.

BACKGROUND OF THE INVENTION

Field of the Invention

The invention relates to a method for operating exhaust gas after-treatment components that are arranged in the exhaust tract of an internal combustion engine with exhaust gas pressure charging. A partial exhaust gas stream is removed from a main exhaust gas stream upstream of at least one exhaust turbine, the partial exhaust gas stream is fed back into the main exhaust gas stream downstream of the at least one exhaust turbine, and at least one exhaust gas after-treatment component is arranged downstream of this feed. The quantity of exhaust gas diverted as a partial exhaust gas stream is subjected to open-loop or closed-loop control in accordance with at least one setpoint temperature at least one defined point in the exhaust tract, especially in the partial exhaust gas stream and/or at the at least one exhaust gas after-treatment component.

The invention also relates to a device for after-treating exhaust gas in an exhaust gas stream from an internal combustion engine, especially for carrying out the above process. The assembly has at least one exhaust line routed from the internal combustion engine to the exhaust turbine, a turbine discharge line leading away from the exhaust turbine, a bypass line which branches off from at least one exhaust line upstream of the exhaust turbine and opens into the turbine discharge line at a feed downstream of the exhaust turbine, and at least one exhaust gas after-treatment component arranged downstream of the feed. The assembly further comprises an electronic control unit, especially an engine controller, that forms an open-loop and/or a closed-loop controller, and by means of which the quantity of exhaust gas passed via the bypass line as a partial exhaust gas stream can be subjected to open-loop or closed-loop control in accordance with at least one setpoint temperature at least one defined point in the exhaust tract, especially in the partial exhaust gas stream and/or at the at least one exhaust gas after-treatment component.

Owing to ever-stricter exhaust emissions limits, which can no longer be complied with solely by measures applied to the engine, most internal combustion engines are now equipped with after-treatment systems for reducing pollutant emissions. Apart from solid particles, the restricted exhaust gas components that arise during the combustion processes, the permitted emissions of which are being continuously lowered, also include nitrogen oxides, in particular. Various methods are currently being used to minimize these exhaust gas components in the case of internal combustion engines operated in motor vehicles. Normally, nitrogen oxide levels are reduced with the aid of catalysts, and in this case a reducing agent, especially hydrocarbons, ammonia or urea, is additionally metered into an oxygen-rich exhaust gas in order to increase selectivity and $NO_x$ conversion rates. The method employed is referred to as the SCR method, which is used to carry out selective catalytic reduction (SCR). Three-way catalysts, on the other hand, are used to reduce nitrogen oxide levels downstream of engines operated at lambda=1. These oxidation catalysts are used to oxidize unburnt hydrocarbons and carbon monoxide.

To minimize fine particles in vehicles, particle separators or particle filters are used. A typical assembly for use in vehicles, having a particle separator, is known from U.S. Pat. No. 6,370,916 B1 and its counterpart European published patent application EP 1 022 765 A1, for example. On the other hand, an assembly and a method involving a particle filter is known from U.S. Pat. No. 4,902,487 (cf. European published patent application EP 0 341 832 A2). In these publications an oxidation catalytic converter is arranged upstream of the particle separator or particle filter. The converter oxidizes the nitric oxide in the exhaust gas with the aid of the residual oxygen that is likewise present to give nitrogen dioxide:

$$2NO + O_2 \leftrightarrow 2NO_2$$

It should be noted here that the equilibrium of the above reaction at high temperatures is on the NO side. This in turn has the effect that the achievable proportions of $NO_2$ at high temperatures are limited owing to this thermodynamic limit. This $NO_2$ in turn reacts with the carbon particles in the particle separator or particle filter to give CO, $CO_2$, $N_2$ and NO. Thus, the powerful oxidizing agent $NO_2$ results in continuous removal of the deposited fine particles in a well-known manner. As a result, there is no need for complex regeneration cycles of the kind that have to be carried out in other arrangements. In this case, therefore, the term "passive regeneration" is used. The reaction equations are as follows:

$$2NO_2 + C \rightarrow 2NO + CO_2$$

$$2NO_2 + 2C \rightarrow 2NO + 2CO$$

$$2C + 2NO_2 \rightarrow N_2 + 2CO_2$$

If the carbon deposited in the particle filter is not completely oxidized by means of the $NO_2$, the proportion of carbon and hence the exhaust gas back pressure increase continuously. In order to avoid this, there is currently an increasing trend towards providing particle filters with a catalytic coating designed to oxidize NO. These are usually platinum-containing catalysts. The disadvantage of this method, however, is that the $NO_2$ formed at the particle filter can only be used to oxidize particles that have been deposited downstream of the catalytically active layer for oxidation of NO, that is to say within the filter medium. If, on the other hand, a layer of deposited particles, referred to as a "filter cake" is formed on the filter surface and hence on the catalytically active layer, the NO oxidation catalyst is downstream of the filter cake, with the result that the soot particles deposited there cannot be oxidized with the aid of $NO_2$ from the NO oxidation catalyst applied to the particle filter. In addition, there is the fact that, to be precise, only the catalyst layer applied to the untreated gas side contributes to the performance of the system since the $NO_2$ formed catalytically on the clean gas side can no longer come into contact with the soot deposited on the untreated gas side and within the filter material. For this reason, it is not possible to dispense with an NO oxidation catalyst ahead of the particle filter, despite the catalytic coating of the filter, and the result is a relatively large overall volume.

Although soot oxidation is still possible at temperatures of up to 250° C. by way of the measures described above, there are applications in which even these exhaust gas temperatures are not achieved sufficiently often and hence reliable functioning of the particle filter cannot be ensured. This generally occurs with engines that are subject to light loading, are installed in vehicles and exhibit additional high proportions of idling, as in passenger cars, regular service buses or refuse collecting trucks.

A second way of regenerating the particle filter is therefore employed, especially in such cases. This consists in actively raising the exhaust gas temperature. This is generally accomplished by adding hydrocarbons (HC) upstream of oxidation catalysts. The addition of the hydrocarbons can be performed by means of a separate injection nozzle mounted in the exhaust tract. Another possibility is to generate high hydrocarbon emissions by means of a late secondary fuel injection into the combustion chamber. The exothermic oxidation of the hydrocarbons at the catalysts then leads to a significant rise in temperature. If there is a resulting increase in temperature to above 600° C., oxidation of the carbon by means of oxygen takes place in accordance with the following equation:

$$C+O_2 \rightarrow CO_2$$

The oxidation of the hydrocarbons at the catalysts which is required in order to increase the exhaust gas temperature takes place at temperatures of around 230° C. However, there is the problem, especially with engines that have exhaust gas turbocharging and are subject to light loading, that even these temperatures are often no longer achieved downstream of the exhaust turbine. The reason is that considerable amounts of exhaust gas enthalpy are removed from the exhaust gas in order to allow compression on the fresh air side. This problem is exacerbated when using two-stage pressure charging and/or very high exhaust gas recirculation rates.

Not only the methods for reducing particulates but also the above-described methods for reducing gaseous pollutant levels are dependent on sufficiently high exhaust gas temperatures, but it is often impossible to achieve these in normal operation, as already described.

Moreover, there is often another problem when using catalysts: the catalysts are poisoned by exhaust gas components such as oxides of sulfur derived from the sulfur in the fuel or engine oil. Although this poisoning is often reversible and can be reversed by means of high exhaust gas temperatures, there is once again the problem here that these high exhaust gas temperatures are not achieved, especially downstream of exhaust turbochargers. Thus at least 500° C. is necessary for regenerating NO oxidation catalysts and over 600° C. is necessary for regenerating $NO_x$ storage catalysts.

German published patent application DE 199 13 462 A1 has furthermore disclosed a method for thermal hydrolysis and metering of urea or an aqueous urea solution in a reactor. To increase the dwell time of the urea in the reactor, a partial stream is taken from the exhaust line and used to form ammonia in the reactor. The relatively small quantity of exhaust gas in the partial stream means that the flow velocity in the reactor is low and the dwell time for conversion of the urea is correspondingly long. After the reactor, the partial stream is added back to the exhaust line, and the ammonia formed can be used to reduce $NO_x$ in the downstream SCR catalyst.

Patent application publication No. US 2008/0041052 A1 and its counterpart German published patent application DE 10 2006 038 291 A1, furthermore, disclosed diverting a partial exhaust gas stream upstream of an exhaust turbine, this partial exhaust gas stream being reunited with the main exhaust gas stream downstream of the exhaust turbine and then flowing through at least one exhaust gas after-treatment component as a hot exhaust gas stream. A structure similar in terms of its basic principle is also described in the commonly assigned U.S. Pat. Nos. 7,937,933 B2 and 7,802,419 B2 and their counterpart German published patent applications DE 10 2006 038 290 A1 and DE 10 2006 038 289 A1.

SUMMARY OF THE INVENTION

It is accordingly an object of the invention to provide a method and a device for exhaust gas after-treatment which overcome the above-mentioned disadvantages of the heretofore-known devices and methods of this general type and which provides for a method for operating exhaust gas after-treatment components and an exhaust gas after-treatment device, by means of which it is possible, in conjunction with an exhaust turbocharger device, to heat exhaust gas after-treatment components arranged downstream of an exhaust turbine efficiently and effectively.

With the foregoing and other objects in view there is provided, in accordance with the invention, a method of operating exhaust gas after-treatment components arranged in an exhaust tract of an internal combustion engine equipped with exhaust gas pressure charging, the method which comprises:

removing a partial exhaust gas stream from a main exhaust gas stream upstream of at least one exhaust turbine;

subjecting the quantity of exhaust gas diverted as a partial exhaust gas stream to open-loop or closed-loop control in accordance with at least one setpoint temperature determined at least one defined point in the exhaust tract (e.g., in the diverted partial exhaust gas stream and/or at the particle filter); and feeding back the partial exhaust gas stream into the main exhaust gas stream at a feed junction downstream of the at least one exhaust turbine, between an NO oxidation catalytic converter and a particle filter disposed in the exhaust tract.

In other words, the objects are achieved, according to the invention, in that a partial exhaust gas stream is removed from a main exhaust gas stream upstream of at least one exhaust turbine, which partial exhaust gas stream is fed back into the main exhaust gas stream downstream of the at least one exhaust turbine. Arranged downstream of this feed is at least one exhaust gas after-treatment component, the quantity of exhaust gas diverted as a partial exhaust gas stream being subjected to open-loop or closed-loop control in accordance with at least one setpoint temperature at least one defined point in the exhaust tract, especially in the partial exhaust gas stream and/or at the at least one exhaust gas after-treatment component. According to the invention, the partial exhaust gas stream is furthermore fed back between an NO oxidation catalyst and a particle filter. This is an advantageous way of ensuring that the particle filter can be held at a high exhaust gas temperature level without a decrease in the proportions of $NO_2$ owing to excessive temperatures at the NO oxidation catalyst, and/or that soot burnoff can be accelerated if sufficient quantities of $NO_2$ are available but the temperatures at the particle filter are too low.

It is thus a basic concept of the invention to remove a partial exhaust gas stream upstream of at least one exhaust turbine and to feed this partial exhaust gas stream back into the main exhaust gas stream downstream of the at least one exhaust turbine, thereby ensuring that the partial exhaust gas stream is at a significantly higher temperature level than the main exhaust gas stream flowing through the exhaust turbine, thus resulting in a higher exhaust gas temperature downstream of the point where the two streams are combined than would be the case if the entire exhaust gas stream were passed through the exhaust turbine. However, since the efficiency of the exhaust turbine and/or the work to be obtained therefrom is generally reduced by removing the partial exhaust gas stream, it is furthermore proposed by the invention that the quantity of exhaust gas diverted as a partial exhaust gas stream be subjected to open-loop or closed-loop control in accordance with at least one setpoint temperature in the partial exhaust gas stream and/or at the at least one exhaust gas after-treatment component, thus making it possible to optimize the efficiency losses of the exhaust turbine.

An additional means of achieving this is to provide at least one variable throttling and/or shutoff device in the partial exhaust gas stream and/or in the main exhaust gas stream, which device makes it possible to divert the partial exhaust gas stream routed past the exhaust turbine in a way that is simple both in terms of component engineering and of open-loop and/or closed-loop control engineering. Furthermore, it is an extremely simple matter to throttle or even completely shut down the partial exhaust gas stream with a throttling and/or shutoff device when the exhaust gas temperatures downstream of the exhaust turbine are sufficiently high. If a waste gate is required to protect the turbocharger and/or the engine, one appropriate option is to use the bypass line for the partial exhaust stream in combination with a throttling and/or shutoff device as a waste gate. Suitable throttling and/or shutoff devices are valves, slide valves, flaps or the like, for example.

In addition or as an alternative, the quantity of exhaust gas removed as a partial exhaust gas stream can be subjected to open-loop or closed-loop control by means of variable turbine geometry (VTG), by means of which it is possible to vary the flow through the exhaust turbine by throttling the main exhaust gas stream.

The setpoint temperature is preferably specified in accordance with defined component and/or operating parameters of the internal combustion engine and/or of the exhaust gas after-treatment device, especially in accordance with the type of the at least one exhaust gas after-treatment component used and/or with the setpoint pollutant conversion rate and/or with the level of pollutant emissions before and/or after the after-treatment component(s) and/or with the total quantity of exhaust gas and/or with the quantities of reducing agent, especially fuel and/or urea, added to the exhaust tract, and/or with the quantity of the partial exhaust gas stream and/or with the exhaust gas oxygen content and/or with the running time of the internal combustion engine and/or of the individual exhaust gas after-treatment components and/or with an actual pollutant conversion rate and/or with the operating mode of the internal combustion engine, especially according to a normal mode or a regeneration mode of the internal combustion engine. Thus, for example, the required exhaust gas temperatures in regeneration mode are significantly above those in normal mode, e.g. during the desulfation of catalysts or the regeneration of particle filters by combustion. The respectively required exhaust gas temperature or setpoint temperature is specified in accordance with the operating point by means of an electronic control unit, especially an engine controller, formed by an open-loop and/or closed-loop control device.

In order to specify the respectively required exhaust gas temperature or setpoint temperature for the respective operating point, a very wide variety of input variables can be determined by an electronic control unit, such as the engine controller, e.g. the current exhaust gas temperature and/or the current temperature of an exhaust gas after-treatment component and/or the induced air mass and/or the setpoint pollutant conversion rate and/or the actual pollutant conversion rate and/or the quantities of reducing agent, especially fuel and/or urea, added to the exhaust tract and/or the level of pollutant emissions before and/or after the after-treatment component(s) and/or the load condition of the particle filter/separator and/or the exhaust gas backpressure and/or the charge pressure, and/or the quantity of exhaust gas possibly fed back to the intake air line and/or the quantity of exhaust gas diverted as a partial exhaust gas stream and/or the charge pressure and/or a charge air temperature and/or a turbocharger speed of rotation. The current exhaust gas temperatures can be detected with the aid of temperature sensors arranged at suitable points, for example. As an alternative or in addition, however, it is also possible for the current exhaust gas temperature to be determined in accordance with the operating point by means of suitable models. Such models can comprise characteristics or characteristic maps stored in the electronic control unit, for example.

If, for example, a quantity of exhaust gas diverted as a partial exhaust gas stream in a basic setting is not sufficient to achieve the desired setpoint temperature, the main exhaust gas stream downstream of the point where the partial stream is removed and upstream of the point of return can be throttled, especially with the aid of a VTG charge assembly, in such a way that an even larger quantity of exhaust gas is diverted past the turbine as a partial exhaust gas stream. If these throttling measures are still not sufficient, especially in regeneration mode, it is furthermore additionally possible to modify defined operating parameters of the internal combustion engine in order to achieve the setpoint temperature. Such defined operating parameters can be the air/fuel ratio and/or the start of injection and/or the number of injections and/or the injection pressure and/or the quantity of exhaust gas fed back to the intake air line (exhaust gas recirculation rate), for example, which are modified in such a way as to ensure that the exhaust gas temperature rises further. Of course, in principle, measures of this kind can also be provided from the outset in certain operating modes of the internal combustion engine, e.g. in regeneration mode.

In principle, the partial exhaust gas stream can be routed or arranged outside the exhaust tract. However, this leads to pronounced cooling. It is therefore more sensible to arrange the partial exhaust gas stream in the exhaust tract in such a way that the exhaust gas in the main exhaust gas stream flows around it. It is thereby advantageously possible to reduce heat losses.

In addition, at least one catalyst can be arranged in the diverted partial exhaust gas stream and/or in the exhaust section carrying the main exhaust gas stream, between the exhaust turbine and the recirculation point of the partial exhaust gas stream, thereby advantageously making it possible to save installation space.

With the above and other objects in view there is also provided, in accordance with the invention, device for after-treating exhaust gas in an exhaust gas stream from an internal combustion engine equipped with and exhaust turbine for exhaust gas pressure charging and having an NO oxidation catalyst and a particle filter disposed in an exhaust gas tract, the device comprising:

at least one exhaust line routed from the internal combustion engine to the exhaust turbine, a turbine discharge line leading away from the exhaust turbine;

a bypass line branching off from said at least one exhaust line upstream of the exhaust turbine and opening into said turbine discharge line at a feed downstream of the exhaust turbine, downstream of the NO oxidation catalyst and upstream of the particle filter; and an electronic control unit forming an open-loop and/or closed-loop controller configured to subject a quantity of exhaust gas passed via said bypass line as a partial exhaust gas stream to open-loop or closed-loop control in accordance with at least one setpoint temperature at least one defined point in the exhaust tract.

In other words, the device, which is particularly suited to carry out the above-summarized method according to the invention, comprises at least one exhaust line, which is routed from the internal combustion engine to the exhaust turbine, and one turbine discharge line leading away from the exhaust turbine. Branching off from at least one of the exhaust lines, upstream of the exhaust turbine, is a bypass line, which opens into the turbine discharge line at a feed downstream of the exhaust turbine. The bypass line opens into the turbine discharge line between an NO oxidation catalyst and a particle filter, and this leads to the advantages already mentioned above in connection with the implementation of the method in accordance with the invention. The device according to the invention furthermore comprises an electronic control unit, especially an engine controller, as an open-loop and/or closed-loop controller, by means of which the quantity of exhaust gas passed via the bypass line can be subjected to open-loop or closed-loop control in accordance with at least one setpoint temperature in the partial exhaust gas stream and/or at the at least one exhaust gas after-treatment component. The exhaust gas after-treatment components are preferably catalysts and/or particle filters and/or particle separators. Suitable catalysts include three-way catalysts and/or SCR catalysts and/or diesel oxidation catalysts and/or $NO_x$ storage catalysts and/or NO oxidation catalysts, for example.

Other features which are considered as characteristic for the invention are set forth in the appended claims.

Although the invention is illustrated and described herein as embodied in a method for operating components for exhaust gas after-treatment and exhaust gas after-treatment apparatus, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The FIGURE is a schematic view of an exhaust gas after-treatment configuration according to an exemplary embodiment of the invention.

DETAILED DESCRIPTION OF THE INVENTION

Referring now to the sole FIGURE of the drawing in detail there is shown an exhaust gas after-treatment device, in which the exhaust gas stream coming from a non-illustrated internal combustion engine is divided upstream of an exhaust turbine 14 of an exhaust turbocharger 13 into a main exhaust gas stream 10, which is passed through the exhaust turbine 14 and, by way of the latter, drives an air compressor 15, and a partial exhaust gas stream 11. Downstream of the exhaust turbine 14, this partial exhaust gas stream 11 is reunited with the main exhaust gas stream 10, which travels in a bypass line 2 that opens into a turbine discharge line 5 leading away from the exhaust turbine 14, at a feed junction 7 downstream of the exhaust turbine 14.

In the illustration, by way of example, there are in this case respective variable throttling and/or shutoff devices 12 and 16 in both the bypass line 2 and the turbine discharge line 5. The devices 12, 16 are connected to an electronic control unit, especially an engine control unit 19, by way of control lines 17, 18, represented here in a purely schematic way by dash-dotted lines.

An optional oxidation catalytic converter 3 can furthermore be arranged in the bypass line 2 to oxidize hydrocarbons, for example. Purely by way of example and schematically to illustrate the principle of the present inventive concept, respective temperature sensors 22, 23 are in this case arranged both in the partial exhaust gas stream 11 and at the particle filter 6, respectively. The sensors detect a current temperature in the partial exhaust gas stream 11 and at the particular filter 6 and feed the temperatures, in the form of input variables, to the electronic control unit 19 via the control lines 8, 9.

If the requirement for regenerating the particle filter 6 by combustion is then recognized or detected by the engine controller 19 in a periodic regeneration mode, the engine controller 19 actuates the throttling and/or shutoff devices 12, 16, of which there are two in this case by way of example, in such a way that a defined quantity of exhaust gas is diverted as a partial exhaust gas stream 11 from the exhaust gas stream passed to the exhaust turbine 14, and the setpoint temperature required for particle filter regeneration is obtained as the setpoint temperature in the partial exhaust gas stream 11 and/or at the particle filter 6. In this way, an optimum exhaust gas temperature in the exhaust tract of the internal combustion engine is obtained at all times in a reliable and optimized way that is simple in terms of open-loop and closed-loop control engineering and is such that particle filter regeneration can be carried out in an optimum manner.

According to the invention, the partial exhaust gas stream 11 is fed in downstream of the NO oxidation catalyst 4, thereby making it possible to ensure that the particle filter 6 arranged upstream of the feed 7 can be operated at a higher temperature level than the NO oxidation catalyst 4. This makes it possible to hold the particle filter 6 at a high exhaust gas temperature level without a decrease in the quantity of $NO_2$ formed at the NO oxidation catalyst 4 owing to excessive temperatures at the NO oxidation catalyst 4, and/or to accelerate soot burnoff if sufficient quantities of $NO_2$ are available but the temperatures at the particle filter 6 are too low.

The invention claimed is:

1. A method for passive regeneration of a particle filter arranged in an exhaust tract of an internal combustion engine charged with exhaust gas pressure, the method which comprises:
removing a partial exhaust gas stream from a main exhaust gas stream upstream of at least one exhaust turbine;
feeding back the partial exhaust gas stream into the main exhaust gas stream at a feed junction downstream of the at least one exhaust turbine, between an NO oxidation catalytic converter and a particle filter disposed in the exhaust tract;
providing the particle filter downstream of the feed junction;
subjecting the quantity of exhaust gas diverted as a partial exhaust gas stream to open-loop or closed-loop control with the aid of at least one variable throttling and/or shutoff device and actuating said at least one throttling and/or shutoff device arranged in the partial exhaust gas stream as a waste gate by means of an engine controller;
subjecting the quantity of exhaust gas diverted as a partial exhaust gas stream to open-loop or closed-loop control in dependence upon a first setpoint temperature partial exhaust gas stream and a second setpoint temperature in the particle filter for holding the particle filter at an exhaust gas temperature level without a decrease in the proportions of $NO_2$ owing to excessive temperatures at the NO oxidation catalytic convertor, and in order to accelerate soot burnoff when sufficient quantities of $NO_2$ are available but the temperatures at the particle filter are below 250° C.; and
removing deposited fine particles in the particle filter by passive regeneration according to the following equations:

$$2NO_2+C \rightarrow 2NO+CO_2$$

$$2NO_2+2C \rightarrow 2NO+2CO$$

$$2C+2NO_2 \rightarrow N_2+2CO_2.$$

2. The method according to claim 1, which comprises placing at least one variable throttling and/or shutoff device in a main exhaust gas stream.

3. The method according to claim 1, wherein the electronic control unit is an engine controller.

4. The method according to claim 1, which comprises modifying at least one defined operating parameter selected from the group consisting of an air/fuel ratio, a start of injection, a number of injections, an injection pressure, and a quantity of exhaust gas fed back to the intake air line.

5. The method according to claim 1, which comprises guiding the main exhaust gas stream to flow at least partially around the partial exhaust gas stream or the partial exhaust gas stream is routed outside of the main exhaust gas stream, with a spacing relative to the main exhaust gas stream.

* * * * *